(12) United States Patent
Sosale et al.

(10) Patent No.: US 11,144,930 B2
(45) Date of Patent: Oct. 12, 2021

(54) SYSTEM AND METHOD FOR MANAGING SERVICE REQUESTS

(71) Applicant: Cognizant Technology Solutions India Pvt. Ltd., Chennai (IN)

(72) Inventors: Yogesh Gundurao Sosale, Bangalore (IN); Santosh Kumar Dubey, Oakland, NJ (US); Rohan Prakash, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 197 days.

(21) Appl. No.: 16/026,201

(22) Filed: Jul. 3, 2018

(65) Prior Publication Data

US 2019/0354991 A1 Nov. 21, 2019

(30) Foreign Application Priority Data

May 16, 2018 (IN) .............................. 201841018277

(51) Int. Cl.
*G06Q 30/00* (2012.01)
(52) U.S. Cl.
CPC ................................. *G06Q 30/016* (2013.01)
(58) Field of Classification Search
CPC ............................ G06Q 30/016; G06N 20/00
USPC .......................................................... 705/304
See application file for complete search history.

(56) References Cited

U.S. PATENT DOCUMENTS

| 10,305,758 | B1* | 5/2019 | Bhide | G06F 16/2477 |
|---|---|---|---|---|
| 2008/0148248 | A1 | 6/2008 | Volkmer | |
| 2012/0072781 | A1* | 3/2012 | Kini | G06F 11/008 714/47.3 |
| 2012/0204167 | A1 | 8/2012 | Yoshida | |
| 2014/0310222 | A1* | 10/2014 | Davlos | G06F 11/2294 706/46 |
| 2017/0302540 | A1* | 10/2017 | Monahan | H04L 41/5074 |

(Continued)

OTHER PUBLICATIONS

Landau, Ted, "OS X First Aid," Macworld, May 2006, pp. 56-64 (Year: 2006).*

(Continued)

*Primary Examiner* — Richard W. Crandall
(74) *Attorney, Agent, or Firm* — Cantor Colburn LLP

(57) ABSTRACT

A system and computer-implemented method for managing service request is provided. The system comprises a collaboration engine configured to receive one or more service requests from one or more service management tools. The system further comprises a classification engine configured to identify a configuration item and problem type corresponding to each of the one or more received service requests. Furthermore, the system comprises a policy engine configured to determine one or more pre-stored rules associated with the identified configuration item and problem type. The system also comprises a recommendation engine configured to recommend at least one of: one or more diagnostic actions and one or more resolution actions corresponding to the one or more determined pre-stored rules. In addition, the system comprises an automation engine configured to perform at least one of: the one or more recommended diagnostic actions and the one or more recommended resolution actions.

17 Claims, 3 Drawing Sheets

(56) References Cited

U.S. PATENT DOCUMENTS

2018/0060225 A1* 3/2018 Tao .................... G06F 11/3612

OTHER PUBLICATIONS

Kessler, Topher, "Unlocking Disk Utility's Hidden Secrets," Macworld Digital Edition, Mar. 2015, vol. 32 Issue 3, pp. 10-14 (Year: 2015).*

Kissell, Joe, "Can't Get Online," Macworld, May 2013, vol. 30 Issue 5, p. 48-50 (Year: 2013).*

Klement, "Squash Bugs with IBM Debugging Tools," SystemiNetwork. com, Feb. 2009, pp. 25-30 (Year: 2009).*

Dezide, "Technology: Dezide Bayesian Guides," [online], archived on Feb. 19, 2016, available at: < https://web.archive.org/web/20160219030705/http://www.dezide.com/technology/> (Year: 2016).*

Kalibha et al., "Software Troubleshooting using Machine Learning," 2017 IEEE 24th International Conference on High Performing Computing Workshops. Available at: < https://ieeexplore.ieee.org/document/8291856 >, made available on IEEEXplor Feb. 15, 2018 (Year: 2018).*

Kissell, Joe, "Fix Mac Slowdowns," Macworld, Feb. 2008, vol. 25 Issue 2, pp. 100-104 (Year: 2008).*

* cited by examiner

SYSTEM AND METHOD FOR MANAGING SERVICE REQUESTS

CROSS REFERENCE TO RELATED APPLICATION

This application is related to and claims the benefit of Indian Patent Application Number 201841018277 filed on May 16, 2018, the contents of which are herein incorporated by reference in their entirety.

FIELD OF THE INVENTION

The present invention relates generally to service request management. More particularly, the present invention provides a system and method for automatically and efficiently managing service requests.

BACKGROUND OF THE INVENTION

In current scenario, software service companies receive and resolve numerous service requests including software change requests and incident management requests. Usually, these requests are critical and require quick resolution.

Conventionally, software services companies employ support staff and subject matter experts for resolving service requests. The support staff identify issues, execute steps for diagnosing possible causes and based on the diagnostic results perform remedial actions. In case the support staff is unable to resolve service requests at their end, the requests are forwarded to subject matter experts. However, human intervention for resolving service requests is inefficient, time consuming, prone to errors and costly.

In light of the above-mentioned disadvantages, there is a need for a system and method for automatically and efficiently managing service requests. Further, there is a need for a system and method that automatically resolves software issues by employing artificial intelligence and machine learning. Furthermore, there is a need for a system and method that eliminates dependency on support staff and subject matter experts for managing service requests. In addition, there is a need for a system and method that is capable of self-learning based on execution status of previous service requests thereby facilitating automation and accuracy.

SUMMARY OF THE INVENTION

A system, computer-implemented method and computer program product for managing service request is provided. The system comprises a collaboration engine configured to receive one or more service requests from one or more service management tools. The system further comprises a classification engine configured to identify a configuration item and problem type corresponding to each of the one or more received service requests. Furthermore, the system comprises a policy engine configured to determine one or more pre-stored rules associated with the identified configuration item and problem type. The system also comprises a recommendation engine configured to recommend at least one of: one or more diagnostic actions and one or more resolution actions corresponding to the one or more determined pre-stored rules. In addition, the system comprises an automation engine configured to perform at least one of: the one or more recommended diagnostic actions and the one or more recommended resolution actions.

In an embodiment of the present invention, the system further comprises a context based resolution engine configured to recommend one or more resolution actions based on result of each of the one or more performed diagnostic actions. In an embodiment of the present invention, the one or more service requests comprise incident management requests, information technology service requests and software change requests. In an embodiment of the present invention, the one or more service requests are triggered based on one of: a reactive event and a proactive event. In an embodiment of the present invention, the one or more service requests comprise textual event description of the problem to be resolved. In an embodiment of the present invention, the configuration item and problem type corresponding to each of the one or more received service requests is identified using natural language processing. In an embodiment of the present invention, the one or more diagnostic actions are actions to be performed for determining cause of the problem associated with the received one or more service requests. Further, each of the one or more diagnostic actions have corresponding one or more resolution actions. In an embodiment of the present invention, the one or more resolution actions are remedial actions performed to resolve the problem corresponding to the received one or more service requests.

The computer-implemented method for managing service request, via program instructions stored in a memory and executed by a processor, comprises receiving one or more service requests from one or more service management tools. The computer-implemented method further comprises identifying a configuration item and problem type corresponding to each of the one or more received service requests. Furthermore, the computer-implemented method comprises determining one or more pre-stored rules associated with the identified configuration item and problem type. The computer-implemented method also comprises recommending at least one of: one or more diagnostic actions and one or more resolution actions corresponding to the one or more determined pre-stored rules. In addition, the computer-implemented method comprises performing at least one of: the one or more recommended diagnostic actions and the one or more recommended resolution actions.

The computer program product for managing service request comprises a non-transitory computer-readable medium having computer-readable program code stored thereon, the computer-readable program code comprising instructions that when executed by a processor, cause the processor to: receive one or more service requests from one or more service management tools. The processor further identifies a configuration item and problem type corresponding to each of the one or more received service requests. Furthermore, the processor determines one or more pre-stored rules associated with the identified configuration item and problem type. The processor also recommends at least one of: one or more diagnostic actions and one or more resolution actions corresponding to the one or more determined pre-stored rules. In addition, the processor performs at least one of: the one or more recommended diagnostic actions and the one or more recommended resolution actions.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automatically and efficiently managing service requests is described herein. The invention provides for a system and method that automatically resolves issues by employing artificial intelligence and machine learning. The invention further provides for a system and method that eliminates dependency on support staff and subject matter experts for managing service requests. The invention also provides for a system and method that is capable of self-learning based on execution status of previous service requests thereby facilitating automation and accuracy.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
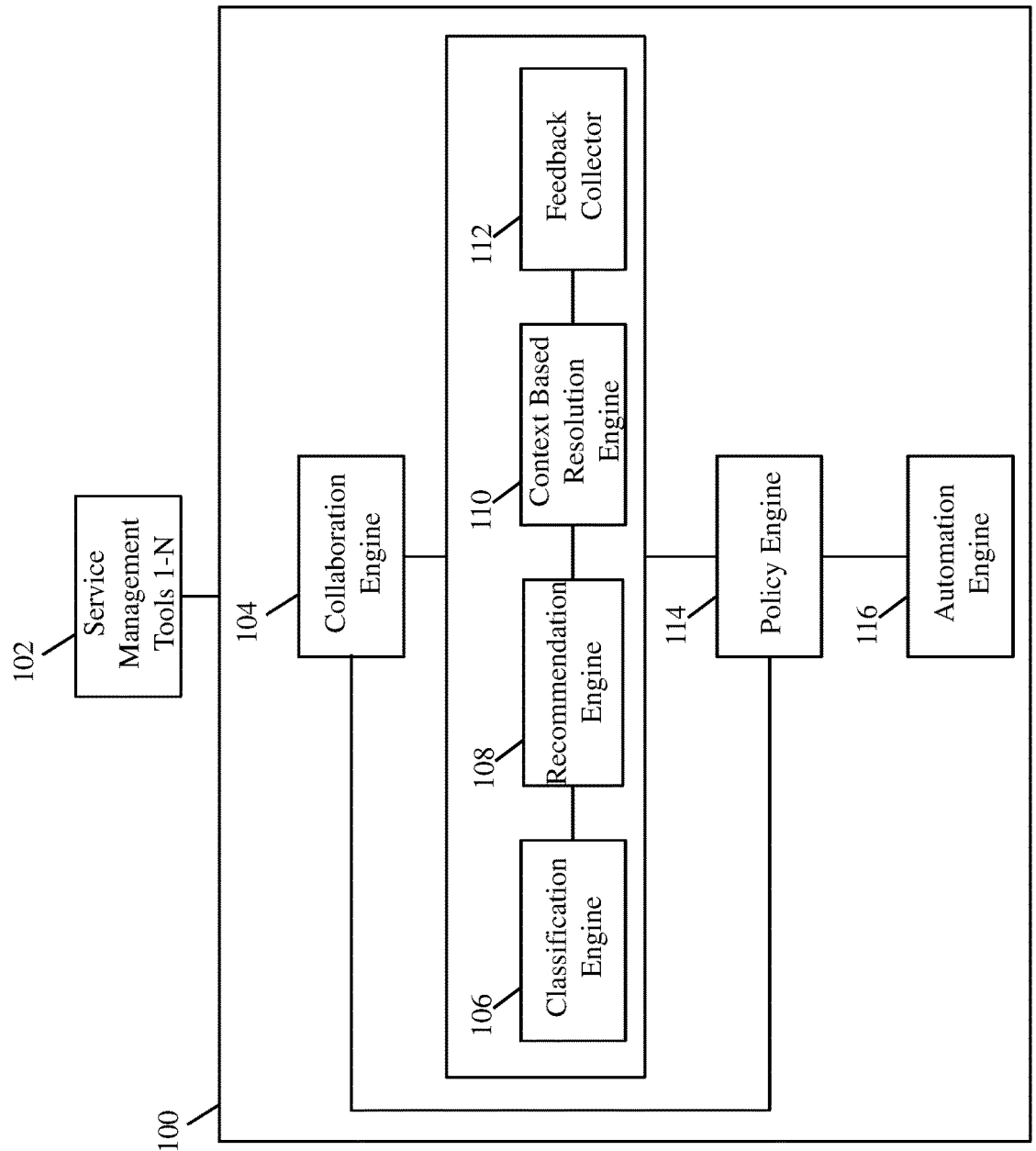
FIG. 1 is a block diagram illustrating a system for automatically and efficiently managing service requests, in accordance with an embodiment of the present invention.

FIG. 1 is a block diagram illustrating a system for automatically and efficiently managing service requests, in accordance with an embodiment of the present invention. The system 100 comprises a collaboration engine 104, a classification engine 106, a recommendation engine 108, a context based resolution engine 110, a feedback collector 112, a policy engine 114 and an automation engine 116.

The collaboration engine 104 is configured to receive one or more service requests from one or more service management tools 102. The one or more service requests include, but not limited to, incident management requests, information technology service requests and software change requests. In an embodiment of the present invention, the one or more service requests are triggered based on, but not limited to, reactive events and proactive events. In an embodiment of the present invention, CPU utilization crossing a threshold value of 75% is a reactive event as it is captured after the breach. In an embodiment of the present invention, identification of an anomaly to avoid potential future issues is a proactive event. For example, on analyzing logs, the monitoring tool observes that the received logs have some error which would then trigger a service request. The one or more service requests include, but not limited to, textual event description of the problem to be resolved. The one or more service management tools 102 are existing Information Technology Service Management (ITSM) tools used by one or more organizations for delivering, managing and supporting IT services. In an embodiment of the present invention, the one or more service management tools 102 are alerted by one or more monitoring tools whenever the one or more monitoring tools detect any issues related to IT services. Based on the alerts received, the one or more service management tools 102 send the one or more service requests to the collaboration engine 104 to be acted upon for diagnosing and resolving the issues.

The collaboration engine 104 forwards the one or more received service requests to the classification engine 106. The classification engine 106 is configured to identify at least a configuration item and a problem type corresponding to each of the one or more received service requests. Further, the configuration item include, but not limited to, any server, device, application, user ID and software program that requires some action to be replicated/performed for troubleshooting. The classification engine 106 identifies the configuration item and problem type based on the textual event description of the one or more received service requests. For example, textual event description of a service request received by the classification engine 106 is "threshold of CPU usage exceeded; current value is 89.000000 for svr-1511272104905." The classification engine 106 determines that the problem type for the aforementioned service request is "CPU utilization" and the configuration item is a server identified as "svr-1511272104905". In an embodiment of the present invention, the classification engine 106 uses natural language processing for identifying the configuration item and problem type if the same is not present in the one or more received service requests. Further, the classification engine 106 is trained using previously resolved service requests to accurately classify new service requests. Furthermore, the collaboration engine 104 collects and forwards, either continuously or periodically, the classification data for new service requests to the feedback collector 112 for training of the classification engine 106 and accurate classification of future service requests.

Once the configuration item and the problem type corresponding to each of the one or more received service requests is identified, the collaboration engine 104 communicates with the policy engine 114. The policy engine 114 is a rules engine configured to determine at least one of: one or more pre-stored policies and one or more pre-stored rules associated with the identified configuration item and the problem type. The one or more pre-stored rules comprise pre-defined conditions and pre-defined actions. The policy engine 114 also considers attributes such as, but not limited to, operating system, IP address, application name and location associated with the one or more received service requests to determine the one or more pre-stored rules and policy associated with the identified configuration item and problem type. Referring back to the above-mentioned service request example, the policy engine 114 determines that the pre-stored rule associated with the identified configuration item (server) and problem type (CPU utilization) is "CPU Utilization Rule". The policy engine 114 fetches the "CPU Utilization Rule" categorized and stored under "Policy Name: Linux Utilization Policy" based on the identified configuration item (i.e. server), identified problem type (i.e. CPU utilization) and identified Operating System (OS) type (i.e. Linux). In an embodiment of the present invention, the configuration item, the problem type and the OS type constitute the condition for the above-mentioned service request. Further, each condition has corresponding pre-stored rules and associated diagnostic actions and resolution actions.

The policy engine 114 is further configured to trigger the recommendation engine 108 for recommending, during prediction phase, at least one of: one or more diagnostic actions and one or more resolution actions corresponding to the one or more determined pre-stored rules. The recommendation engine 108 and the context based resolution engine 110 are trained initially and thereafter periodically for recommending diagnostic and resolution actions. The one or more diagnostic actions are actions to be performed for determining cause of the problem associated with the received one or more service requests. Further, each of the one or more diagnostic actions may have corresponding one or more resolution actions. The one or more resolution actions are remedial actions performed to resolve the problem corresponding to the received one or more service requests.

In an embodiment of the present invention, the recommendation engine 110 and the context based resolution engine 110 employ various machine learning techniques for generating models for accurately recommending diagnostic and resolution actions corresponding to the one or more pre-stored rules. During training phase, the recommendation engine 108 and the context based resolution engine 110 are provided with numerous sets of configuration item and problem type and corresponding diagnostic actions and resolution actions executed by one or more users. Further, the recommendation engine 108 is modelled using Alternating Least Square (ALS) algorithm. The context based resolution engine 110 is trained using algorithms such as, but not limited to, decision tree algorithm, Naïve Bayes, multi-layer perceptron for the executed diagnostics and problem type based on their output. In an embodiment of the present invention, training is a continuous process and engines within the system 100 receive feedback via the feedback collector 112 at regular intervals and re-modelled periodically.

Once trained, the engines can be used for recommendation during prediction phase. In an embodiment of the present invention, the one or more received service requests do not require diagnosing the problem and only require a resolution action recommendation. In another embodiment of the present invention, the recommendation engine 108 recommends most relevant diagnostic actions corresponding to the one or more determined pre-stored rules associated with the one or more received service requests. The automation engine 116 then facilitates executing the one or more diagnostic actions. Further, based on the result of each of the one or more executed/performed diagnostic actions, the context based resolution engine 110 in conjunction with the recommendation engine 108 is configured to recommend one or more resolution actions. The automation engine 116 then executes the one or more recommended resolution actions.

In an embodiment of the present invention, the automation engine 116 comprises one or more scripts which are mapped to the one or more diagnostic actions and the one or more resolution actions. Further, the one or more scripts are capable of communicating with one or more devices associated with the identified configuration item of the one or more received service requests. Furthermore, the automation engine 116 is capable of performing the one or more diagnostic actions and the one or more resolution actions by executing the one or more scripts corresponding to each of the one or more diagnostic actions and the one or more resolution actions.

In an embodiment of the present invention, the feedback collector 112 is a web service which receives and forwards feedback in JavaScript Object Notation (JSON) format. For example a sample JSON format based feedback is illustrated below:

```
URI: /events.json?accessKey=ActionRecommendation
Payload: {
    "event":"diagnose",
    "entityType":"ci",
    "entityId":"10.236.220.134-PostgreSQL",
    "targetEntityType":"task",
    "targetEntityId":"1",
    "properties": {
        "problemType": "1"
    }
}
```

In an embodiment of the present invention, the received feedback from the feedback collector 112 is stored in a database for use by the recommendation engine 108 and the context based resolution engine 110. Further, the database records are queried by the recommendation engine 108 and the context based resolution engine 110 during training phase and new models are then generated which are used for subsequent recommendations during prediction phase.

In an embodiment of the present invention, the system 100 is capable of recommending only diagnostic actions for a service request. On receiving the one or more service requests during prediction phase, the classification engine 106 identifies the problem type and configuration item based on the event description. The recommendation engine 108 then recommends several diagnostic actions and the most relevant diagnostic action for the inputted configuration item and problem type. The recommended diagnostics include, but not limited to, configuration item, action identification, action details, recommendation score and recommendation rating. The one or more users then selects, via the collaboration engine 104, one of the recommended diagnostic action for execution. Further, the feedback collector 112 records and feeds the user selection and execution for the service request (comprising configuration item, problem type, operation type and action ID) to the recommendation engine 108 for training.

In an embodiment of the present invention, the system 100 is capable of recommending only resolution actions for a service request which does not require diagnostic actions. On receiving the one or more service requests during prediction phase, the classification engine 106 identifies the problem type and configuration item based on the event description. The recommendation engine 108 then recommends the most relevant resolution action and several other resolution actions for the inputted configuration item and problem type. The one or more users then select and execute, via the collaboration engine 104, one of the recommended resolution action. The feedback collector 112 records and feeds the user selection and execution for the service request (comprising configuration item, problem type, operation type and action ID) to the recommendation engine 108 for training.

In an embodiment of the present invention, the system 100 is capable of recommending resolution actions for a service request based on a user selected diagnostic action. The recommendation engine 108 uses similar products algorithm (cosine function) to identify and recommend resolution actions which are relevant to the selected diagnostic action and associated configuration item and problem type.

In another embodiment of the present invention, the system 100 is capable of recommending resolution actions for a service request based on one or more user executed diagnostic actions. The context based resolution engine 110 uses algorithms such as, but not limited to, decision tree classification, Naïve Bayes classification and multi-layer perceptron to identify the most relevant resolution which end user can execute to resolve the problem based on the user executed diagnostic actions.

In an embodiment of the present invention, the collaboration engine 104 provides a user interface for defining new actions (both diagnostic and resolutions) for new configuration items and problem types. Further, defining new actions comprise providing script name and description. Once executed for resolving a new service request, the defined actions are considered training data for the classification engine 106, the recommendation engine 108 and the context based resolution engine 110.

In an exemplary embodiment of the present invention, a monitoring tool detects an issue and sends an alert to the service management tool 102 to create an incident against an asset for example: "Configuration Item (CI)=srv-12345, CI Type=WebServer, Description=Site xxxxx.yyy.com is down." The service management tool 102 pushes the above-mentioned incident to the collaboration engine 104 as a service request. The collaboration engine 104 forwards the service request to the classification engine 106 which identifies the problem type as "application_outage". The collaboration engine 104 then checks with the policy engine 114 for determining a matching pre-stored rule corresponding to "Condition: Problem Type=Application_Outage and CI Type=WebServer and CI=srv-12345." The recommendation engine 108 in conjunction with the policy engine 114 then recommends relevant diagnostic actions and resolution actions corresponding to the determined pre-stored rule. For example, the recommended diagnostic actions include, but not limited to, checking URL, checking CPU on CI "srv-12345", checking memory on CI, checking disk on CI, checking for connectivity to the CI, checking current process and checking for permissions on CI. In an embodiment of the present invention, the one or more users may execute the one or more diagnostic actions and then execute the one or more recommended resolution actions based on the above executed diagnostic actions via the user interface provided by the collaboration engine 104. In another embodiment of the present invention, the recommended diagnostic actions are automatically executed by the automation engine 116 when triggered by the policy engine 114. On execution, the automation engine 116 generates results of the executed diagnostic actions. In an embodiment of the present invention, the generated results corresponding to the executed diagnostic actions are as follows:

Check URL xxxxx.yyy.com→Failed
Check CPU on CI→Passed
Check for Connectivity to the CI→Passed
Check for process say xyz→Failed
Check for permissions on CI→Passed Based on the above-mentioned results, the context based resolution engine 110 recommends resolution actions. For instance, the context based resolution engine 110 recommends restarting the current process in response to the failure of the current process. In yet another embodiment of the present invention, the recommendation engine 108 recommends resolution actions such as, but not limited to, restarting process, closing process on CI, disabling firewall and enabling permissions on CI without recommending any diagnostic actions. Further, the one or more recommended resolution actions are either executed by the one or more users via the user interface provided by the collaboration engine 104 or automatically executed by the automation engine 116 when triggered by the policy engine 114.

Figure 2:
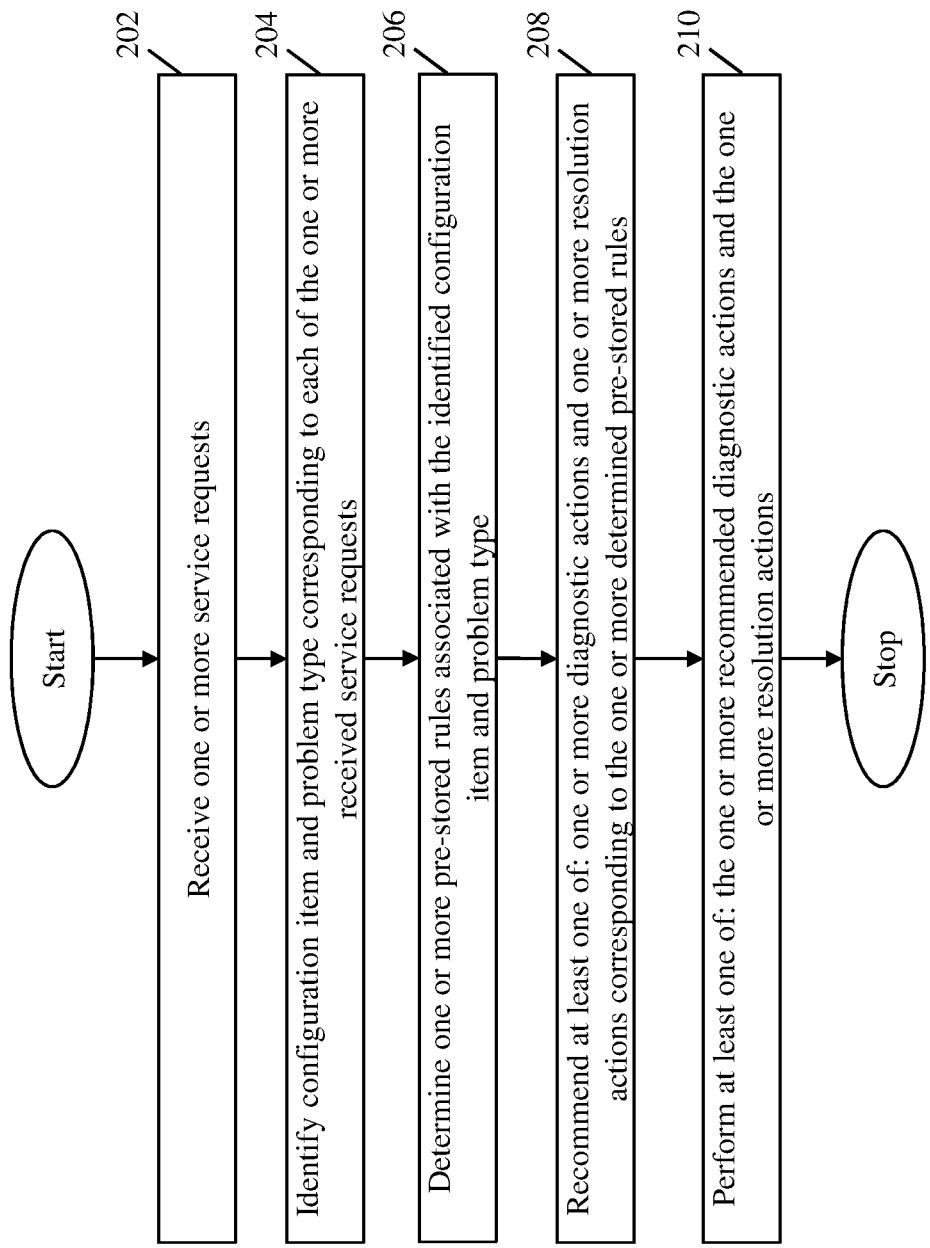
FIG. 2 is a flowchart illustrating a method for automatically and efficiently managing service requests, in accordance with an embodiment of the present invention.

FIG. 2 is a flowchart illustrating a method for automatically and efficiently managing service requests, in accordance with an embodiment of the present invention.

At step 202, one or more service requests are received from one or more service management tools. The one or more service requests include, but not limited to, incident management requests, information technology service requests and software change requests. Further, the one or more service requests contain, but not limited to, textual event description of the problem to be resolved. In an embodiment of the present invention, the one or more service requests are triggered based on, but not limited to, reactive events and proactive events. In an embodiment of the present invention, CPU utilization crossing a threshold value of 75% is a reactive event as it is captured after the breach. In an embodiment of the present invention, identification of an anomaly to avoid potential future issues is a proactive event. For example, on analyzing logs, the monitoring tool observes that the received logs have some error which would then trigger a service request. The one or more service management tools are existing Information Technology Service Management (ITSM) tools used by one or more organizations for delivering, managing and supporting IT services. In an embodiment of the present invention, the one or more service management tools are alerted by one or more monitoring tools whenever the one or more monitoring tools detect any issues related to IT services.

At step 204, configuration item and problem type corresponding to each of the one or more received service requests is identified. Further, the configuration item and problem type are identified based on the textual event description of the one or more received service requests. In an embodiment of the present invention, natural language processing is used for identifying the configuration item and problem type if the same is not present in the one or more received service requests. Further, the identification of the configuration item and problem type is based on previously resolved service requests to accurately classify new service requests. In an embodiment of the present invention, the classification data for new service requests is collected, either continuously or periodically, for training and accurate classification of future service requests.

At step 206, one or more pre-stored rules associated with the identified configuration item and problem type are determined. The one or more pre-stored rules comprise pre-defined conditions and pre-defined actions. Further, attributes such as, but not limited to, operating system, IP address, application name and location associated with the one or more received service requests are considered to determine the one or more pre-stored rules associated with the identified configuration item and problem type.

At step 208, one or more diagnostic actions and/or one or more resolution actions corresponding to the one or more determined pre-stored rules are recommended during prediction phase. The one or more diagnostic actions are actions to be performed for determining cause of the problem associated with the received one or more service requests. The one or more resolution actions are remedial actions performed to resolve problem corresponding to the received one or more service requests. Further, each of the one or more diagnostic actions may have corresponding one or more resolution actions. In an embodiment of the present invention, the one or more received service requests do not require diagnosing the problem and only require a resolution action recommendation. In an embodiment of the present invention, most relevant diagnostic actions corresponding to the one or more determined pre-stored rules associated with the one or more received service requests are recommended.

At step 210, the one or more recommended diagnostic actions and/or the one or more resolution actions are performed. In an embodiment of the present invention, an automation engine facilitates performing/executing the one or more recommended diagnostic actions. Further, based on the result of each of the one or more executed diagnostic actions, a context based resolution engine in conjunction with the recommendation engine is configured to recommend one or more resolution actions. The automation engine then performs/executes the one or more recommended resolution actions. The automation engine comprises one or more scripts which are mapped to one or more actions and are capable of communicating with one or more devices associated with one or more configuration items present in the one or more received service requests. Further, the automation engine is capable of executing the one or more scripts corresponding to each of the one or more diagnostic actions and the one or more resolution actions.

Figure 3:
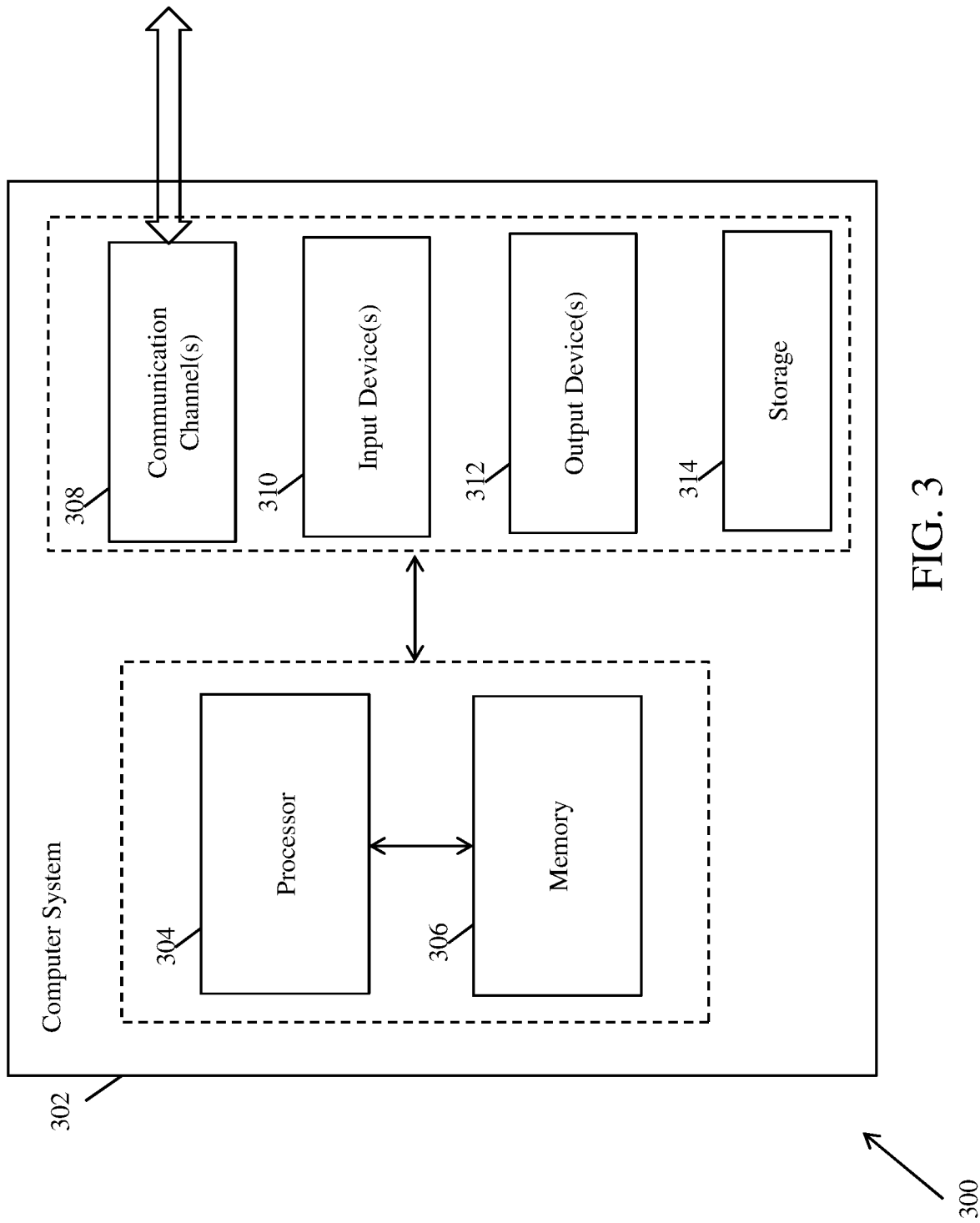
FIG. 3 illustrates an exemplary computer system for automatically and efficiently managing service requests, in accordance with an embodiment of the present invention.

FIG. 3 illustrates an exemplary computer system for automatically and efficiently managing service requests, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for automatically executing a service request, the system comprising:
    a memory storing program instructions;
    a processor executing the program instructions stored in the memory and configured to:
    provide previously resolved service requests to the processor to perform a continuous training process that trains the processor to identify a configuration item and a problem type associated with a service request, the continuous training process including providing the processor with numerous sets of configuration items and problem types that correspond to diagnostic actions and resolution actions associated with the previously resolved service requests, wherein one or more pre-stored rules are determined based on the configuration items and the problem types that correspond to the diagnostic actions and the resolution actions and models are generated by employing machine learning techniques for recommending the at least one of: diagnostic and resolution actions corresponding to one or more pre-stored rules and are re-modelled periodically based on feedback received on identification and execution associated with the service requests at regular intervals as the continuous training process;

after performing the training process, receive service requests from one or more service management tools based on alerts received by the service management tools from one or more monitoring tools;

identify a configuration item and a problem type corresponding to each of the received service requests based on training carried out using the previously resolved service requests and new actions corresponding to diagnostic and resolutions actions selected via a user interface for new configuration items and problem types;

determine the one or more pre-stored rules associated with the identified configuration item and problem type based on attributes associated with the service request, wherein the determined pre-stored rules are fetched based on a condition associated with the service request;

execute the service requests by using the models to recommend at least one of: one or more of the diagnostic actions and one or more of the resolution actions corresponding to the one or more determined pre-stored rules determined in response to performing the continuous training process, wherein a similar products algorithm is used to identify and recommend resolution actions which are relevant to the selected diagnostic action and the associated configuration item and the problem type; and perform at least one of: the one or more recommended diagnostic actions and the one or more recommended resolution actions by executing one or more scripts which are mapped to the diagnostic actions and the resolution actions.

2. The system of claim 1, wherein the processor is configured to perform the diagnostic actions and the resolution actions based on a new script name for mapping to the diagnostic actions and the resolution actions for execution of the service requests comprising new configuration items and problem types which are used as the training data for identifying the configuration items and the problem types.

3. The system of claim 1, wherein the one or more service requests comprise incident management requests, information technology service requests and software change requests.

4. The system of claim 1, wherein the one or more service requests comprise textual event description of the problem to be resolved.

5. The system of claim 1, wherein the configuration item and problem type corresponding to each of the one or more received service requests is identified using natural language processing.

6. The system of claim 1, wherein the one or more diagnostic actions are actions to be performed for determining cause of the problem associated with the received one or more service requests.

7. The system of claim 6, wherein each of the one or more diagnostic actions have corresponding one or more resolution actions.

8. The system of claim 1, wherein the one or more resolution actions are remedial actions performed to resolve the problem corresponding to the received one or more service requests, and wherein the processor recommends only resolution actions for a service request amongst the service requests which does not require diagnostic actions.

9. A computer-implemented method for automatically executing a service request, via program instructions stored in a memory and executed by a processor, the computer-implemented method comprising:

providing previously resolved service requests to the processor to perform a continuous training process that trains the processor to identify a configuration item and a problem type associated with a service request, the continuous training process including providing the processor with numerous sets of configuration items and problem types that correspond to diagnostic actions and resolution actions associated with the previously resolved service requests, wherein one or more pre-stored rules are determined based on the configuration items and the problem types that correspond to the diagnostic actions and the resolution actions and models are generated by employing machine learning techniques for recommending the at least one of: diagnostic and resolution actions corresponding to one or more pre-stored rules and are re-modelled periodically based on feedback received on identification and execution associated with the service requests at regular intervals as the continuous training process;

after performing the training process, receiving service requests from one or more service management tools based on alerts received by the service management tools from one or more monitoring tools;

identifying a configuration item and problem type corresponding to each of the received service requests based on training carried out using the previously resolved service requests and new actions corresponding to diagnostic and resolutions actions selected via a user interface for new configuration items and problem types;

determining the one or more pre-stored rules associated with the identified configuration item and problem type based on attributes associated with the service request, wherein the determined pre-stored rules are fetched based on a condition associated with the service request;

executing the service requests by using the models to recommend at least one of: one or more of the diagnostic actions and one or more of the resolution actions corresponding to the one or more determined pre-stored rules determined in response to performing the continuous training process, wherein a similar products algorithm is used to identify and recommend resolution actions which are relevant to the selected diagnostic action and the associated configuration item and the problem type; and performing at least one of: the one or more recommended diagnostic actions and the one or more recommended resolution actions by executing one or more scripts which are mapped to the diagnostic actions and the resolution actions.

10. The computer-implemented method of claim 9, comprising the step of performing the diagnostic actions and the resolution actions based on a new script name for mapping to the diagnostic actions and the resolution actions for execution of the service requests comprising new configuration items and problem types which are used as the training data for identifying the configuration items and the problem types.

11. The computer-implemented method of claim 9, wherein the one or more service requests comprise incident management requests, information technology service requests and software change requests.

12. The computer-implemented method of claim 9, wherein the one or more service requests comprise textual event description of problem to be resolved.

13. The computer-implemented method of claim 9, wherein the configuration item and problem type corresponding to each of the one or more received service requests is identified using natural language processing.

14. The computer-implemented method of claim 9, wherein the one or more diagnostic actions are actions to be performed for determining cause of the problem associated with the received one or more service requests.

15. The computer-implemented method of claim 14, wherein each of the one or more diagnostic actions have corresponding one or more resolution actions.

16. The computer-implemented method of claim 9, wherein the one or more resolution actions are remedial actions performed to resolve the problem corresponding to the received one or more service requests, and wherein only resolution actions for a service request amongst the service requests which does not require diagnostic actions are performed.

17. A computer program product for automatically executing a service request, the computer program product comprising:

a non-transitory computer-readable medium having computer-readable program code stored thereon, the computer-readable program code comprising instructions that when executed by a processor, cause the processor to:

provide previously resolved service requests to the processor to perform a continuous training process that trains the processor to identify a configuration item and a problem type associated with a service request, the continuous training process including providing the processor with numerous sets of configuration items and problem types that correspond to diagnostic actions and resolution actions associated with the previously resolved service requests, wherein one or more pre-stored rules are determined based on the configuration items and the problem types that correspond to the diagnostic actions and the resolution actions and models are generated by employing machine learning techniques for recommending the at least one of: diagnostic and resolution actions corresponding to one or more pre-stored rules and are re-modelled periodically based on feedback received on identification and execution associated with the service requests at regular intervals as the continuous training process;

after performing the training process, receive service requests from one or more service management tools based on alerts received by the service management tools from one or more monitoring tools;

identify a configuration item and problem type corresponding to each of the received service requests based on training carried out using the previously resolved service requests and new actions corresponding to diagnostic and resolutions actions selected via a user interface for new configuration items and problem types;

determine the one or more pre-stored rules associated with the identified configuration item and problem type based on attributes associated with the service request, wherein the determined pre-stored rules are fetched based on a condition associated with the service request;

execute the service requests by using the models to recommend at least one of: one or more of the diagnostic actions and one or more of the resolution actions corresponding to the one or more determined pre-stored rules determined in response to performing the continuous training process, wherein a similar products algorithm is used to identify and recommend resolution actions which are relevant to the selected diagnostic action and the associated configuration item and the problem type; and perform at least one of: the one or more recommended diagnostic actions and the one or more recommended resolution actions by executing one or more scripts which are mapped to the diagnostic actions and the resolution actions.

* * * * *